US006951402B1

(12) United States Patent
Copp

(10) Patent No.: US 6,951,402 B1
(45) Date of Patent: Oct. 4, 2005

(54) REFRIGERATION APPLIANCE INTERIOR LIGHTING SYSTEM

(76) Inventor: Heath R. Copp, 716 Chestnut, Grand Forks, ND (US) 58201

(*) Notice: Subject to any disclaimer, the term of this patent is extended or adjusted under 35 U.S.C. 154(b) by 180 days.

(21) Appl. No.: 10/421,330

(22) Filed: Apr. 22, 2003

(51) Int. Cl.[7] .................. F21D 27/00; F21V 23/04; H05B 39/04
(52) U.S. Cl. .................. 362/94; 362/276; 362/295; 315/153; 315/158
(58) Field of Search .................. 62/129–131; 315/149, 315/152–154, 157, 158; 362/92, 94, 234, 362/251, 276, 295, 802

(56) References Cited

U.S. PATENT DOCUMENTS

| | | | |
|---|---|---|---|
| 4,072,486 A | 2/1978 | Joseph | 62/131 |
| 4,205,533 A | 6/1980 | Sterling | 62/131 |
| 4,229,664 A * | 10/1980 | Blake et al. | 315/154 |
| 4,851,662 A | 7/1989 | Ott et al. | 250/214 |
| 5,552,676 A * | 9/1996 | Viljanen | 315/158 |
| 5,768,898 A | 6/1998 | Seok et al. | 62/132 |
| 5,909,950 A * | 6/1999 | Seok et al. | 362/94 |
| 6,059,420 A | 5/2000 | Rogers | 362/92 |
| 6,311,509 B1 | 11/2001 | Cartwright et al. | 62/213 |
| 6,402,338 B1 * | 6/2002 | Mitzel et al. | 362/276 |
| 6,478,445 B1 | 11/2002 | Lange et al. | 362/223 |
| 6,726,341 B2 * | 4/2004 | Pashley et al. | 362/92 |

FOREIGN PATENT DOCUMENTS

| JP | 405164461 | 12/1991 | 62/264 |
|---|---|---|---|
| JP | 406034266 | 7/1992 | 62/264 |

* cited by examiner

Primary Examiner—Alan Cariaso

(57) ABSTRACT

A refrigeration appliance interior lighting system for sensing the exterior light level and adjusting the light level accordingly within the interior of the home appliance. The refrigeration appliance interior lighting system includes a control unit in electrical communication with a first light bulb for controlling the illumination intensity of the first light bulb. A light sensor is positioned to measure the exterior light level and communicates the exterior light level to the control unit. When the exterior light level is above a threshold level, the first light bulb emits a high level of illumination. When the exterior light level is below the threshold level, the first light bulb emits a low level of illumination.

17 Claims, 6 Drawing Sheets

REFRIGERATION APPLIANCE INTERIOR LIGHTING SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to home appliance lighting and more specifically it relates to a refrigeration appliance interior lighting system for sensing the exterior light level and adjusting the light level accordingly within the interior of the home appliance.

2. Description of the Related Art

Home refrigeration appliances such as refrigerators and freezers have been in use for years. Typically, refrigeration appliances have an interior lighting system that is illuminated upon the opening of a door to assist the individual with viewing the interior contents of the appliance. Most refrigeration appliances utilize a simple incandescent light bulb to illuminate the interior of the appliance.

The main problem with conventional refrigeration appliances is that the light bulb illuminates a constant light level regardless of the exterior light conditions and level. Hence, even when the exterior light conditions within the surrounding room are relatively low, the light bulb within the appliance will illuminate the same level of light thereby temporarily blinding the individual upon opening of the door.

Examples of patented devices which may be related to the present invention include U.S. Pat. No. 4,851,662 to Ott et al.; Japanese Patent 406034266 to Ogata & Akashi; Japanese Patent 405164461 to Nakamura; U.S. Pat. No. 6,478,445 to Lange et al; U.S. Pat. No. 5,768,898 to Seok et al.; U.S. Pat. No. 4,205,533 to Sterling; U.S. Pat. No. 4,072,486 to Joseph; U.S. Pat. No. 6,059,420 to Rogers; and U.S. Pat. No. 6,311,509 to Cartwright et al.

While these devices may be suitable for the particular purpose to which they address, they are not as suitable for sensing the exterior light level and adjusting the light level accordingly within the interior of the home appliance. Conventional refrigeration appliances have lighting systems that are inadequate for use in varying lighting conditions of a surrounding room.

In these respects, the refrigeration appliance interior lighting system according to the present invention substantially departs from the conventional concepts and designs of the prior art, and in so doing provides an apparatus primarily developed for the purpose of sensing the exterior light level and adjusting the light level accordingly within the interior of the home appliance.

BRIEF SUMMARY OF THE INVENTION

In view of the foregoing disadvantages inherent in the known types of refrigeration appliances now present in the prior art, the present invention provides a new refrigeration appliance interior lighting system construction wherein the same can be utilized for sensing the exterior light level and adjusting the light level accordingly within the interior of the home appliance.

The general purpose of the present invention, which will be described subsequently in greater detail, is to provide a new refrigeration appliance interior lighting system that has many of the advantages of the refrigeration appliances mentioned heretofore and many novel features that result in a new refrigeration appliance interior lighting system which is not anticipated, rendered obvious, suggested, or even implied by any of the prior art refrigeration appliances, either alone or in any combination thereof.

To attain this, the present invention generally comprises a control unit in electrical communication with a first light bulb for controlling the illumination intensity of the first light bulb. A light sensor is positioned to measure the exterior light level and communicates the exterior light level to the control unit. When the exterior light level is above a threshold level, the first light bulb emits a high level of illumination. When the exterior light level is below the threshold level, the first light bulb emits a low level of illumination.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a refrigeration appliance interior lighting system that will overcome the shortcomings of the prior art devices.

A second object is to provide a refrigeration appliance interior lighting system for sensing the exterior light level and adjusting the light level accordingly within the interior of the home appliance.

Another object is to provide a refrigeration appliance interior lighting system that eliminates the blinding effect incurred by an individual opening an appliance door in a darkened room.

An additional object is to provide a refrigeration appliance interior lighting system that provides a desirable level of interior light within a refrigeration appliance based upon the exterior lighting conditions.

A further object is to provide a refrigeration appliance interior lighting system that may be utilized within a new or existing refrigeration appliance.

Another object is to provide a refrigeration appliance interior lighting system that may be utilized within various refrigeration appliances such as but not limited to refrigerators, and freezers (upright freezers, chest freezers, etc.).

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
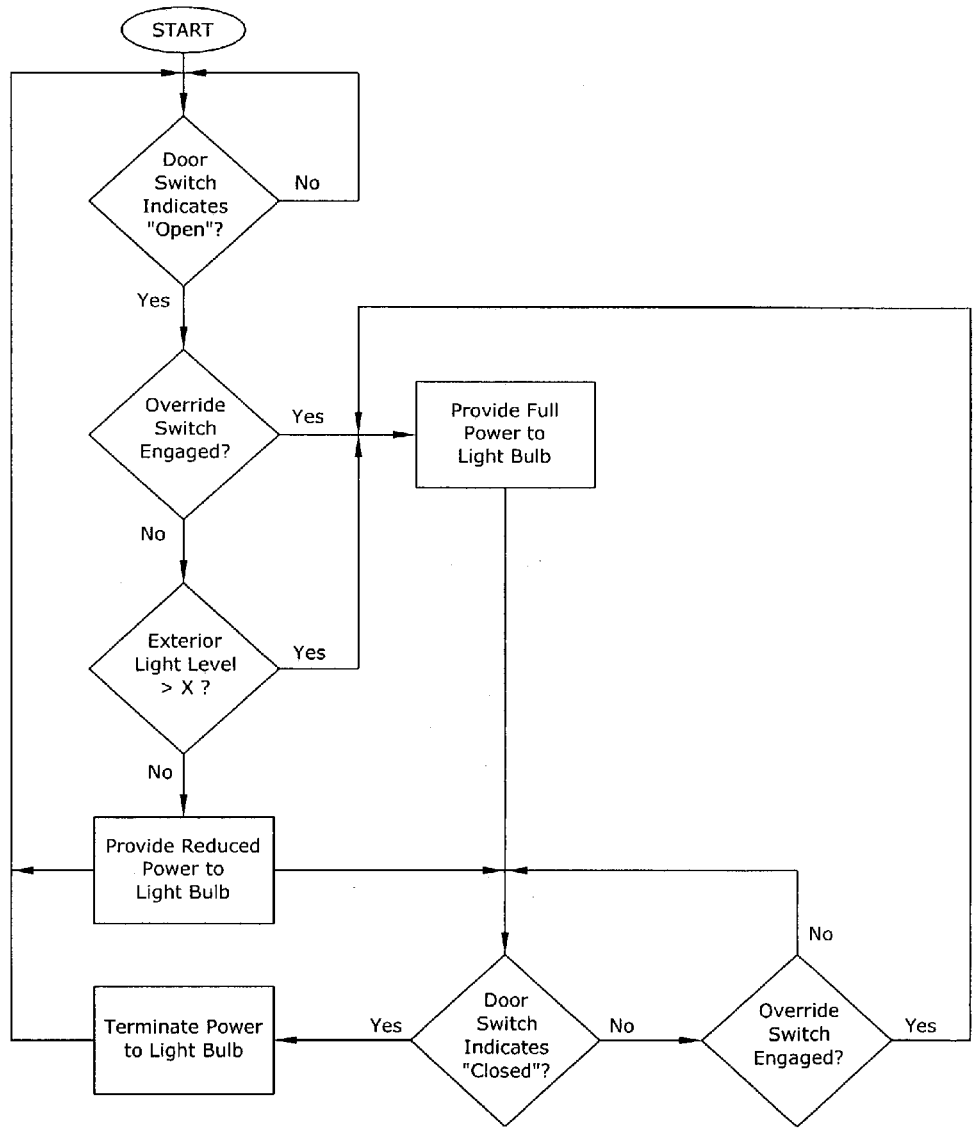
FIG. 1 is a flowchart illustrating the functionality of the present invention.

Turning now descriptively to the drawings, in which similar reference characters denote similar elements throughout the several views, FIGS. 1 through 6 illustrate a refrigeration appliance interior lighting system 10, which comprises a control unit 20 in electrical communication with a first light bulb 72 for controlling the illumination intensity of the first light bulb 72. A light sensor 50 is positioned to measure the exterior light level and communicates the exterior light level to the control unit 20. When the exterior light level is above a threshold level, the first light bulb 72 emits a high level of illumination. When the exterior light level is below the threshold level, the first light bulb 72 emits a low level of illumination.

B. Exemplary Refrigeration Appliance

Home refrigeration appliances 70 such as but not limited to refrigerators and freezers have been in use for years. The present invention may be built integral within a new refrigeration appliance 70 or added as an aftermarket item to an existing refrigeration applicant. Refrigeration appliances 70 have a door that is utilized to seal the interior of the refrigeration appliances 70.

Conventional refrigeration appliances 70 have a door switch 40 that determines when the door is opened or closed. In the present invention, the door switch 40 is in communication with the control unit 20 for indicating to the control unit 20 whether the door is opened or closed.

C. Light Bulb

Figure 3:
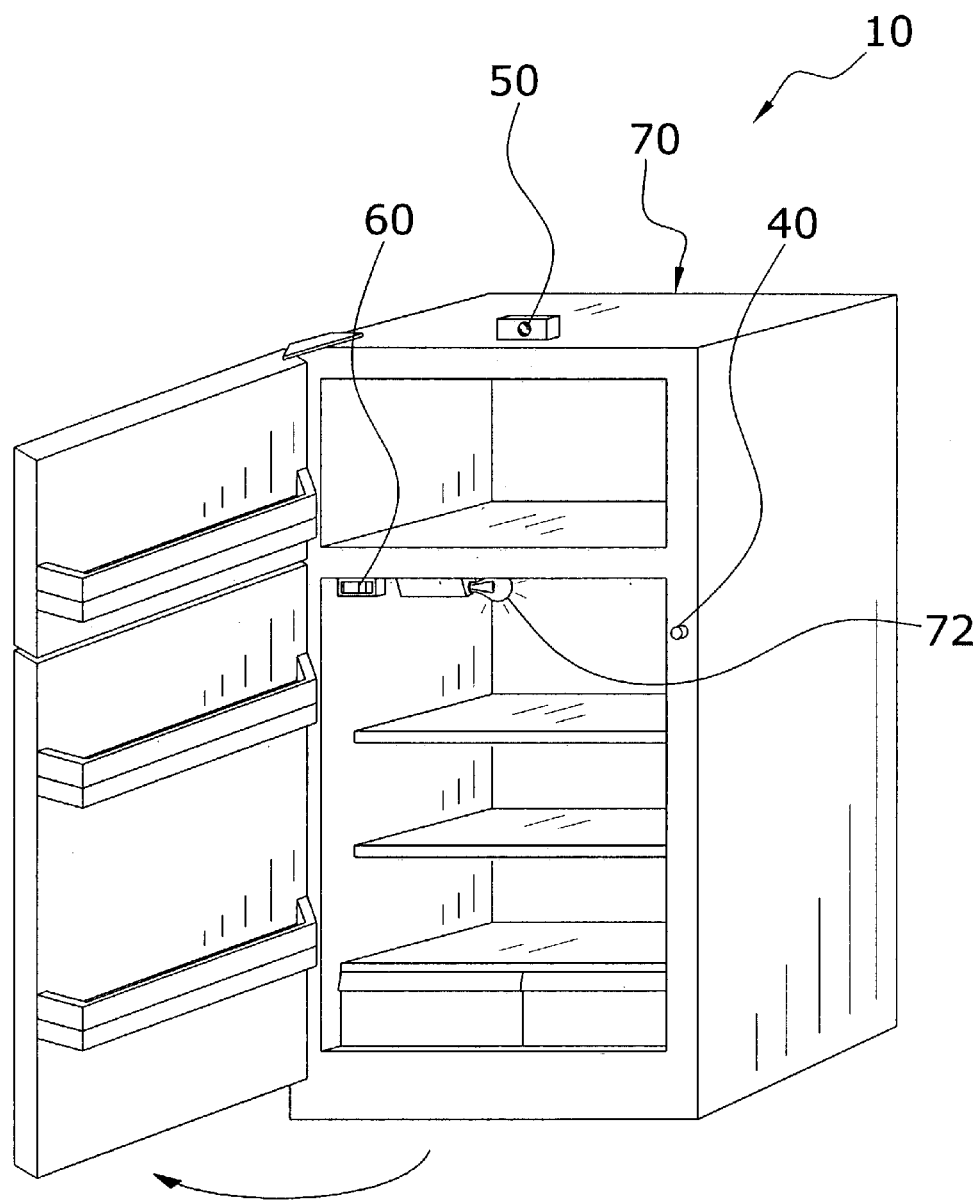
FIG. 3 is an upper perspective view of an exemplary refrigeration appliance with the door being opened.

A first light bulb 72 is positionable within an interior of a refrigeration appliance 70 as best illustrated in FIG. 3 of the drawings. The first light bulb 72 is electrically connected to the control unit 20, where the control unit 20 controls the illumination of the first light bulb 72.

Figure 4:
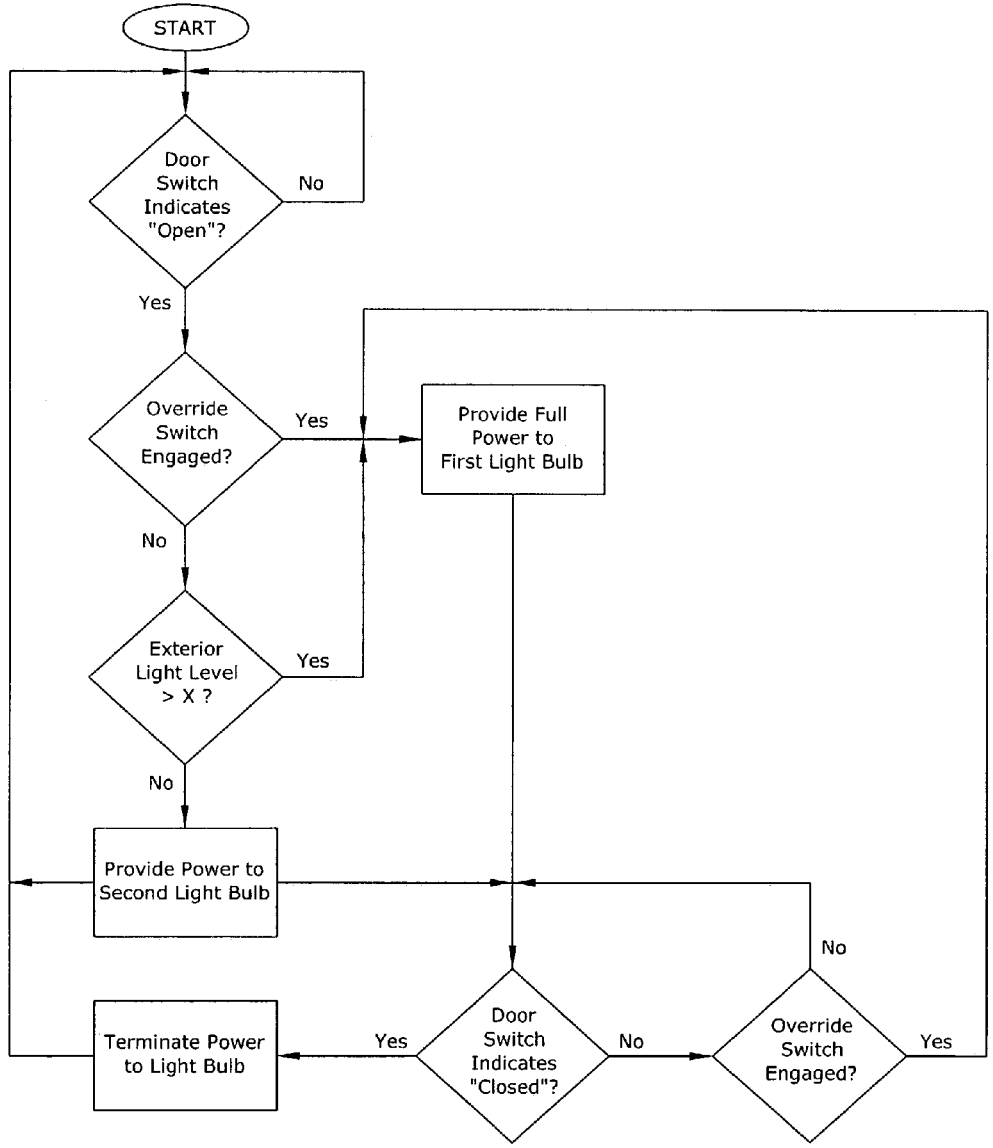
FIG. 4 is a flowchart illustrating the functionality of a second embodiment of the present invention utilizing a second light bulb.
Figure 5:
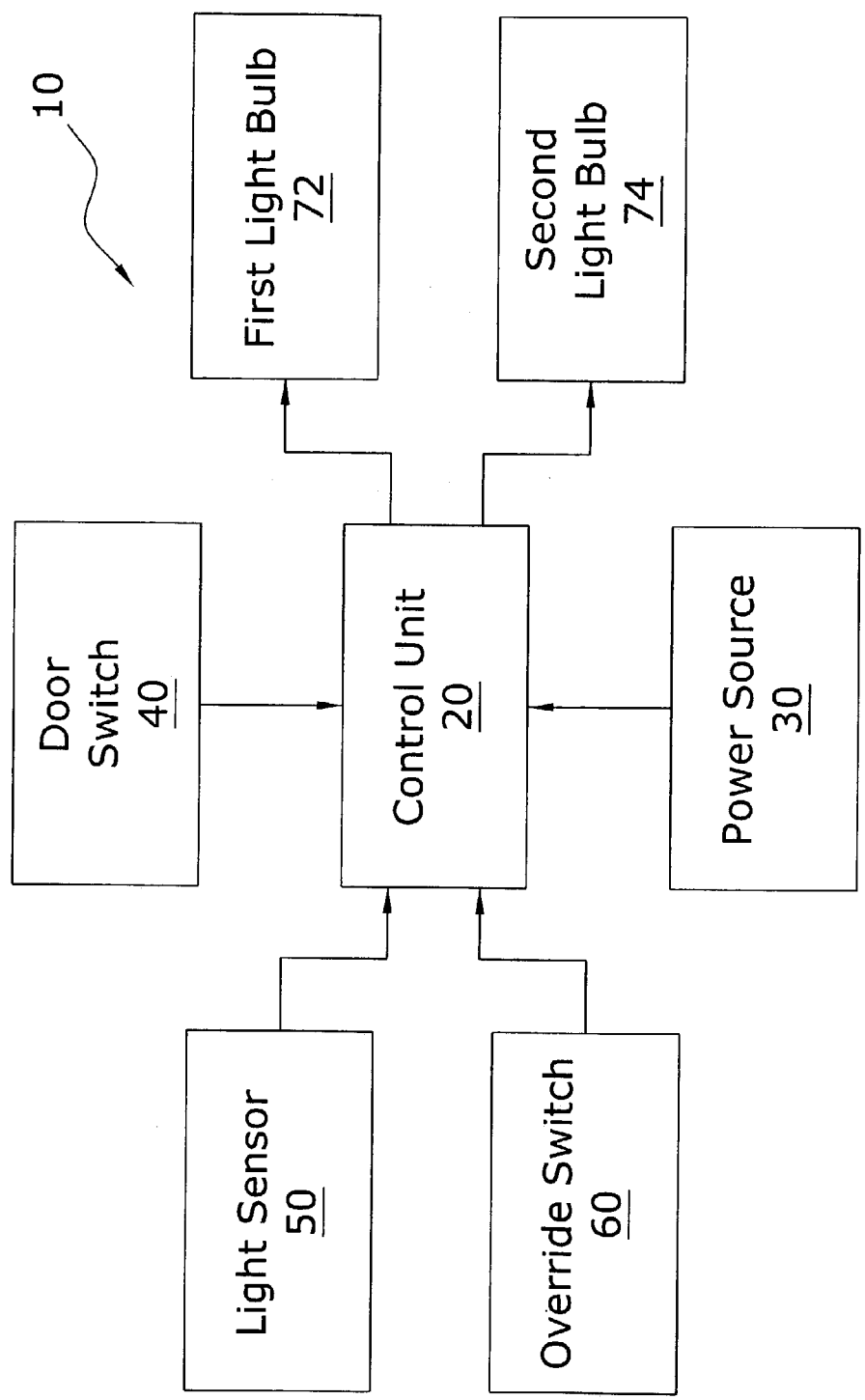
FIG. 5 is a block diagram illustrating the second embodiment of the present invention.
Figure 6:
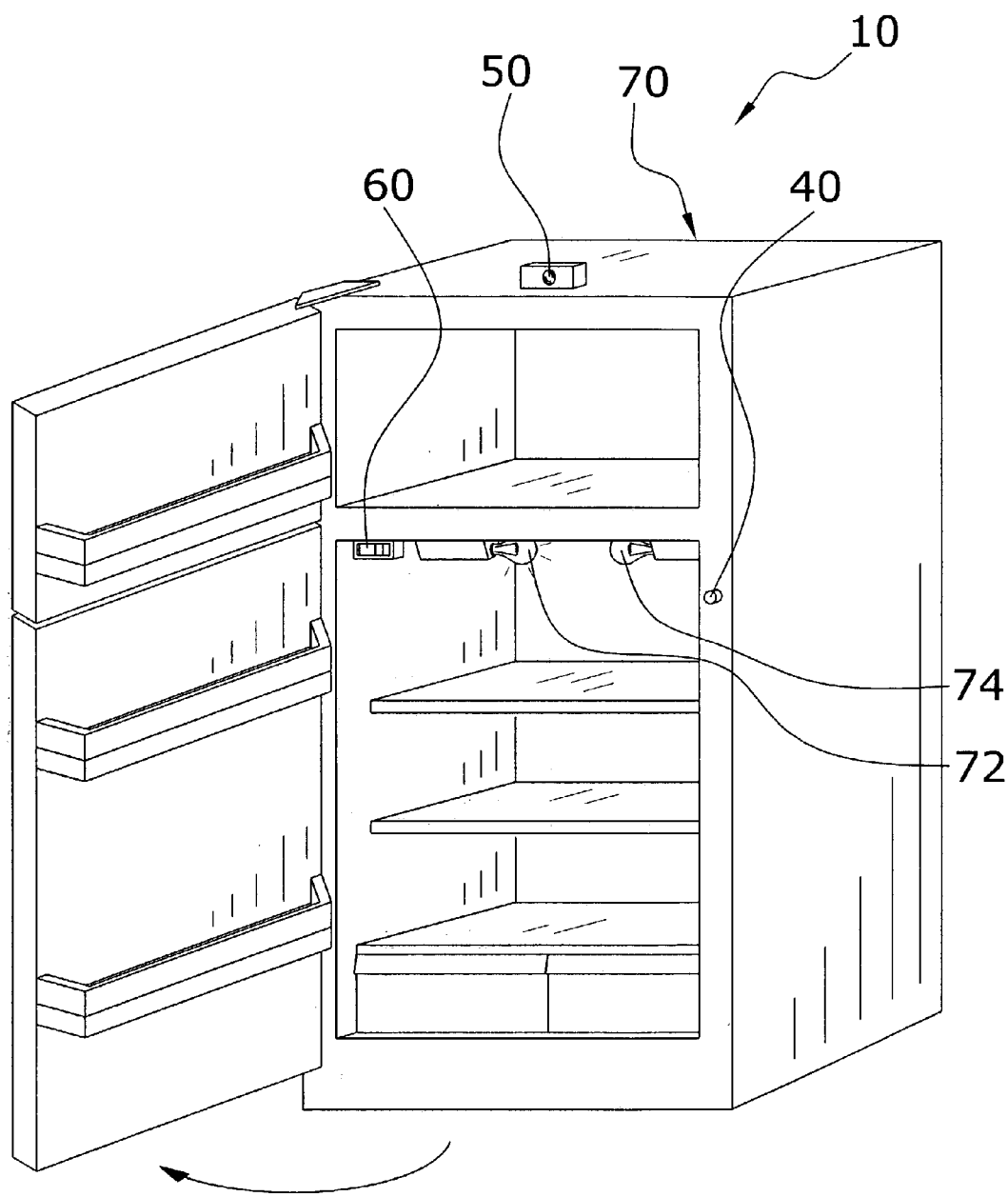
FIG. 6 is an upper perspective view of an exemplary refrigeration appliance with the door being opened with the first and second light bulbs.

In the alternative embodiment shown in FIGS. 4 through 6 of the drawings, a second light bulb 74 is positionable within the interior of the refrigeration appliance 70 and electrically connected to the control unit 20. It can be appreciated that the light bulbs 72, 74 may be comprised of various types of lighting structures such as but not limited to incandescent light bulbs, and that the light bulbs 72, 74 may be positioned in various locations within the interior of the refrigeration appliance 70.

C. Light Sensor

The light sensor 50 is positionable to measure an exterior light level within the room surrounding the refrigeration appliance 70 as shown in FIG. 3 of the drawings. The light sensor 50 may be comprised of various types of sensors capable of determining the exterior light level. The light sensor 50 is in communication with the control unit 20 via various communication means such as but not limited to electrically or through a remote signal.

D. Control Unit

Figure 2:
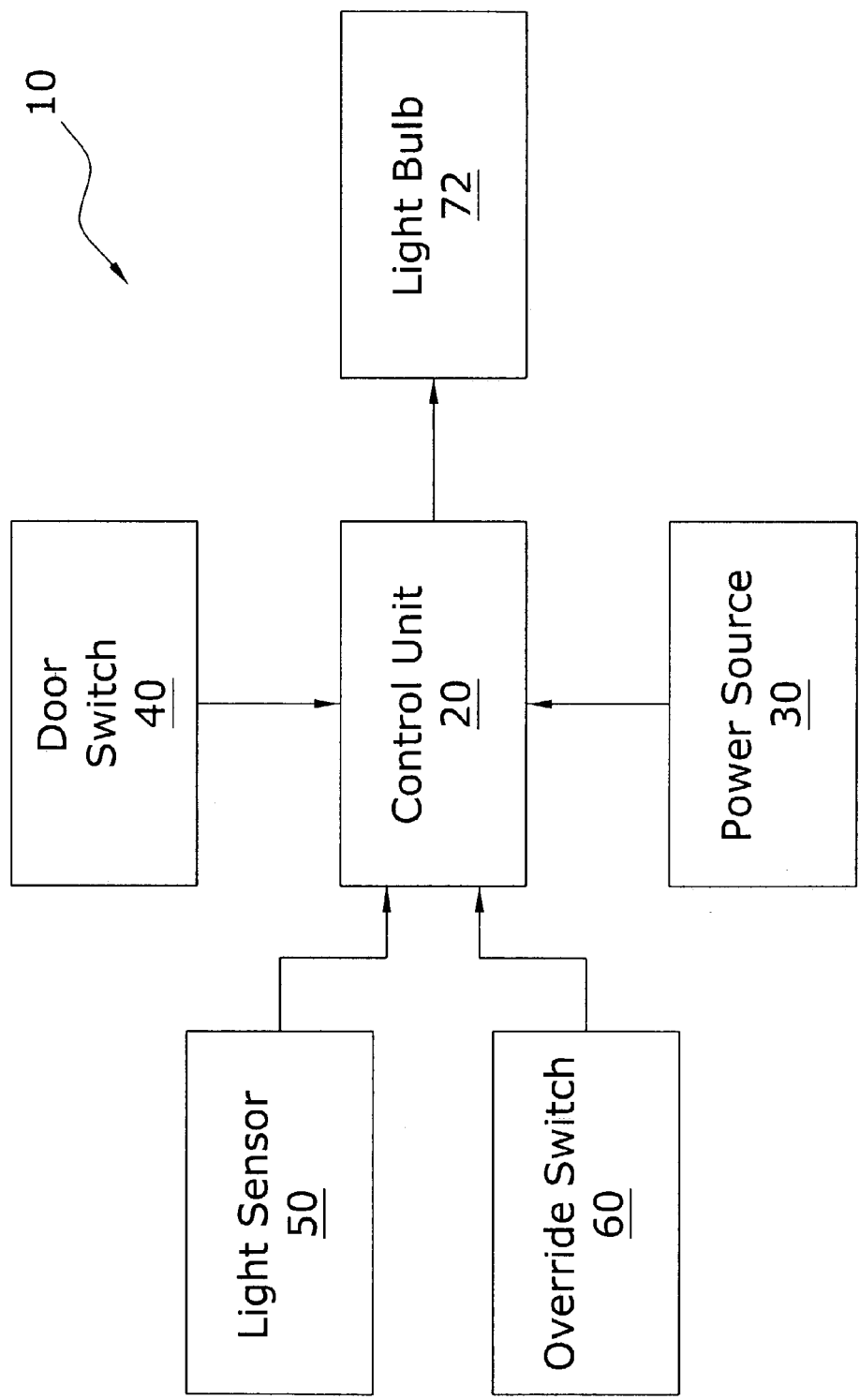
FIG. 2 is a block diagram illustrating the communications between the components of the present invention.

The control unit 20 is in communication with the light sensor 50 and in electrical communication with a first light bulb 72 for controlling an illumination intensity of the first light bulb 72 based upon an exterior light level as shown in FIG. 2 of the drawings. The control unit 20 is electrically connected to a power source 30 either directly or within the appliance 70. The control unit 20 may be comprised of an electronic device capable of storing/receiving/sending data and controlling electrical devices such as but not limited to a computer or electronic circuit.

The control unit 20 is preferably programmable through conventional data input devices such as a keypad, keyboard, scroll control and the like. The control unit 20 preferably allows the user to adjust the threshold level for determining the amount of interior illumination required. The user may preset the threshold level to a constant level or an adjustable level based upon the time of day, day of the week and other factors.

The control unit 20 illuminates the first light bulb 72 if the door of a refrigeration appliance 70 is opened as shown in FIG. 1 of the drawings. The control unit 20 terminates illumination of the first light bulb 72 if a door of a refrigeration appliance 70 is closed as further shown in FIG. 1 of the drawings.

When the exterior light level is above a threshold level the first light bulb 72 emits a first level of illumination as shown in FIG. 1 of the drawings. When an exterior light level is below a threshold level the first light bulb 72 emits a second level of illumination, wherein the second level of illumination is less than the first level of illumination as shown in FIG. 1 of the drawings.

E. Override Switch

An override switch 60 is preferably provided to allow the user to override the control unit 20 in determining the interior illumination level of the appliance 70. The override switch 60 is in communication with the control unit 20 via various communication means such as but not limited electrically or remote signal.

When the exterior light level is below a threshold level the first light bulb 72 emits the lower second level of illumination unless the override switch 60 is selected as shown in FIG. 1 of the drawings. If the override switch 60 is selected, the first light bulb 72 is illuminated to the higher first level of illumination regardless of the exterior light level. If the override switch 60 is not selected, the control unit 20 determines the illumination level of the first light bulb 72.

F. Alternative Embodiment

FIGS. 4 through 6 of the drawings illustrate an alternative embodiment of the present invention including a second light bulb 74 in addition to the first light bulb 72 (the first light bulb 72 having a first level of illumination). The second light bulb 74 is electrically connected to the control unit 20 and is powered by the control unit 20 having a second level of illumination, wherein the second level of illumination is less than the first level of illumination of the first bulb. The illumination levels may be controlled by using various wattage light bulbs or by controlling the voltage to the light bulbs.

When the exterior light level is above the threshold level the first light bulb 72 emits the higher first level of illumination as shown in FIG. 4 of the drawings. When the exterior light level is below the threshold level the second light bulb 74 emits a lower second level of illumination as further shown in FIG. 4 of the drawings. Various combinations may be utilized wherein the first light bulb 72 and the second light bulb 74 are individually illuminated or cooperatively illuminated.

G. Operation

In operation of the main embodiment shown in FIGS. 1 through 3 of the drawings, when the door switch 40 determines that the door has been opened the control unit 20 then activates the first light bulb 72. If the exterior light level is above the threshold level the first light bulb 72 emits a higher first level of illumination as shown in FIG. 1 of the drawings. If the exterior light level is below the threshold level the first light bulb 72 emits a lower second level of illumination. The first light bulb 72 remains illuminated until the door is closed. If the exterior light level changes while the door is open, the control unit 20 may change the illumination of the first light bulb 72 either immediately or after a period of time.

In operation of the alternative embodiment shown in FIGS. 4 through 6 of the drawings, when the door switch 40 determines that the door has been opened the control unit 20 then activates either the first light bulb 72 or the second light bulb 74. If the exterior light level is above the threshold level the first light bulb 72 emits the higher first level of illumination as shown in FIG. 4 of the drawings. If the exterior light level is below the threshold level the second light bulb 74 emits a lower second level of illumination as further shown in FIG. 4 of the drawings. If the exterior light level changes while the door is open, the control unit 20 may change the illumination of the light bulbs 72, 74 either immediately or after a period of time.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A refrigeration appliance interior lighting system, comprising:
   a first light bulb positionable within an interior of a refrigeration appliance;
   a light sensor positionable to measure an exterior light level;
   a control unit in communication with said light sensor and in electrical communication with said first light bulb for controlling an illumination intensity of said first light bulb based upon the exterior light level; and
   an override switch in communication with said control unit.

2. The refrigeration appliance interior lighting system of claim 1, wherein when the exterior light level is above a threshold level said first light bulb emits a first level of illumination, and wherein when the exterior light level is below said threshold level said first light bulb emits a second level of illumination.

3. The refrigeration appliance interior lighting system of claim 2, wherein said second level of illumination is less than said first level of illumination.

4. The refrigeration appliance interior lighting system of claim 3, including a door switch in communication with said control unit for indicating to said control unit the status of a door of the refrigeration appliance, wherein said control unit controls the operation of said first light bulb and wherein said first light bulb is illuminated if the door of the refrigeration appliance is opened.

5. The refrigeration appliance interior lighting system of claim 4, wherein illumination to said first light bulb is terminated if the door of the refrigeration appliance is closed.

6. The refrigeration appliance interior lighting system of claim 1, including a door switch in communication with said control unit for indicating to said control unit the status of a door of the refrigeration appliance, wherein said control unit controls the operation of said first light bulb and wherein said first light bulb is illuminated if the door of the refrigeration appliance is opened.

7. The refrigeration appliance interior lighting system of claim 6, wherein illumination to said first light bulb is terminated if the door of the refrigeration appliance is closed.

8. The refrigeration appliance interior lighting system of claim 1, wherein when the exterior light level is above a threshold level said first light bulb emits a first level of illumination, and wherein when the exterior light level is below said threshold level said first light bulb emits a second level of illumination unless said override switch is selected.

9. The refrigeration appliance interior lighting system of claim 1, including a door switch in communication with said control unit for indicating to said control unit the status of a door of the refrigeration appliance.

10. A refrigeration appliance interior lighting system, comprising:
    a first light bulb positionable within an interior of a refrigeration appliance having a first level of illumination;
    a second light bulb positionable within an interior of the refrigeration appliance having a second level of illumination;
    a light sensor positionable to measure an exterior light level;

a control unit in communication with said light sensor and in electrical communication with said first light bulb and said second light bulb for controlling the illumination of said light bulbs based upon the exterior light level; and an override switch in communication with said control unit.

11. The refrigeration appliance interior lighting system of claim 10, wherein when the exterior light level is above a threshold level said first light bulb emits a first level of illumination, and wherein when the exterior light level is below said threshold level said second light bulb emits a second level of illumination.

12. The refrigeration appliance interior lighting system of claim 11, wherein said second level of illumination is less than said first level of illumination.

13. The refrigeration appliance interior lighting system of claim 12, including a door switch in communication with said control unit for indicating to said control unit the status of a door of the refrigeration appliance wherein said control unit controls the operation of said first light bulb and said second light bulb and wherein one of said light bulbs are illuminated if the door of the refrigeration appliance is opened.

14. The refrigeration appliance interior lighting system of claim 13, wherein illumination to said light bulbs is terminated if the door of the refrigeration appliance is closed.

15. The refrigeration appliance interior lighting system of claim 10, including a door switch in communication with said control unit for indicating to said control unit the status of a door of the refrigeration appliance, wherein said control unit controls the operation of said first light bulb and said second light bulb wherein said first light bulb is illuminated if the door of the refrigeration appliance is opened.

16. The refrigeration appliance interior lighting system of claim 15, wherein illumination to said first light bulb is terminated if the door of the refrigeration appliance is closed.

17. A method of operating a refrigeration appliance interior lighting system, said method comprising the steps of:

monitoring the state of a door of a refrigeration appliance;

determining an exterior light level;

illuminating a first light bulb upon the state of said door being open, wherein when said exterior light level is above a threshold level said first light bulb emits a first level of illumination, and wherein when said exterior light level is below said threshold level said first light bulb emits a second level of illumination wherein said second level of illumination is less than said first level of illumination.

* * * * *